United States Patent [19]
Turman

[11] 3,724,484
[45] Apr. 3, 1973

[54] PARTICLE DENSITY CONTROL SYSTEM FOR COLLOID CORE NUCLEAR REACTOR

[75] Inventor: Bobby N. Turman, Fairborn, Ohio

[73] Assignee: The United States of America as represented by the Secretary of the Air Force

[22] Filed: July 13, 1971

[21] Appl. No.: 162,070

[52] U.S. Cl. ...................137/110, 73/24, 73/28, 176/45, 250/43.5 D, 250/45
[51] Int. Cl. .......................G01n 31/00, G21c 19/28
[58] Field of Search ...176/45; 73/23, 24, 28, 432 PS; 250/43.5 D, 45; 137/109, 110

[56] References Cited

UNITED STATES PATENTS 3,039,948  6/1962  Krucoff .....................176/45 X
3,284,309  11/1966 Murphree ......................176/45
3,381,520  5/1968  Bourquard et al ..............73/24
3,468,157  9/1969  Burk et al ....................73/24
3,557,605  1/1971  Lanneau et al ................73/24

*Primary Examiner*—Alan Cohan
*Assistant Examiner*—David J. Kobkiw
*Attorney*—Harry A. Herbert, Jr. et al.

[57] ABSTRACT

A control system as provided in the fuel charging system for a colloid core reactor to control the particle density in the fuel input to the reactor cavity. A sound transmitter is positioned on one side of a tubular member in the fuel input, and a microphone is located on the opposite side of the tubular member. A signal, proportional to changes in phase resulting from changes in the acoustics in the tubular member, is used to control the gas flow in a by-pass to a cyclone separator fuel supply to control the particle density in the input to the reactor cavity.

4 Claims, 2 Drawing Figures

PARTICLE DENSITY CONTROL SYSTEM FOR COLLOID CORE NUCLEAR REACTOR

BACKGROUND OF THE INVENTION

In systems for charging and discharging fuel in nuclear reactors, for example such as shown in the patent application of William N. Jackomis, "Nuclear Reactor Fuel Charging and Discharging System," Ser. No. 155,741, filed June 23, 1971, which is assigned to the Government of the United States of America as requested by the Secretary of the Air Force, it is desirable to know the density of nuclear particles in the hydrogen gas that flows into the reactor cavity. Acoustical chambers have been used for detecting the composition of a gas, such as in the U.S. Pats. to Burk et al., No. 3,468,157 and Lanneau et al., No. 3,557,605. Experiments have shown that the density of solid particles in a gas can be measured by using the change in the acoustic impedance in somewhat the same manner as in Burk et al. and Lanneau et al. However, the sensing system of Burk et al. and Lanneau et al. would not be satisfactory for this purpose since the solid particles would tend to clog the sensing system. Also, for best results, the particles in gas should be fed to the reactor with as little flow restriction in the flow path as possible.

BRIEF SUMMARY OF THE INVENTION

According to this invention, a particle density system is provided which senses the flow directly in the flow tube, from the nuclear particle supply to the reactor cavity, by locating a sound transmitter on one side of a flow channel and a microphone on the opposite side of the flow channel. Perforated screens, with mesh openings being much less than one wave length of sound wave, are positioned in the flow channel at a distance at least two wave lengths of the sound wave from the sound transmitter and microphone to isolate the sound wave from the remainder of the reactor system.

IN THE DRAWINGS

DETAILED DESCRIPTION OF THE INVENTION

Figure 1:
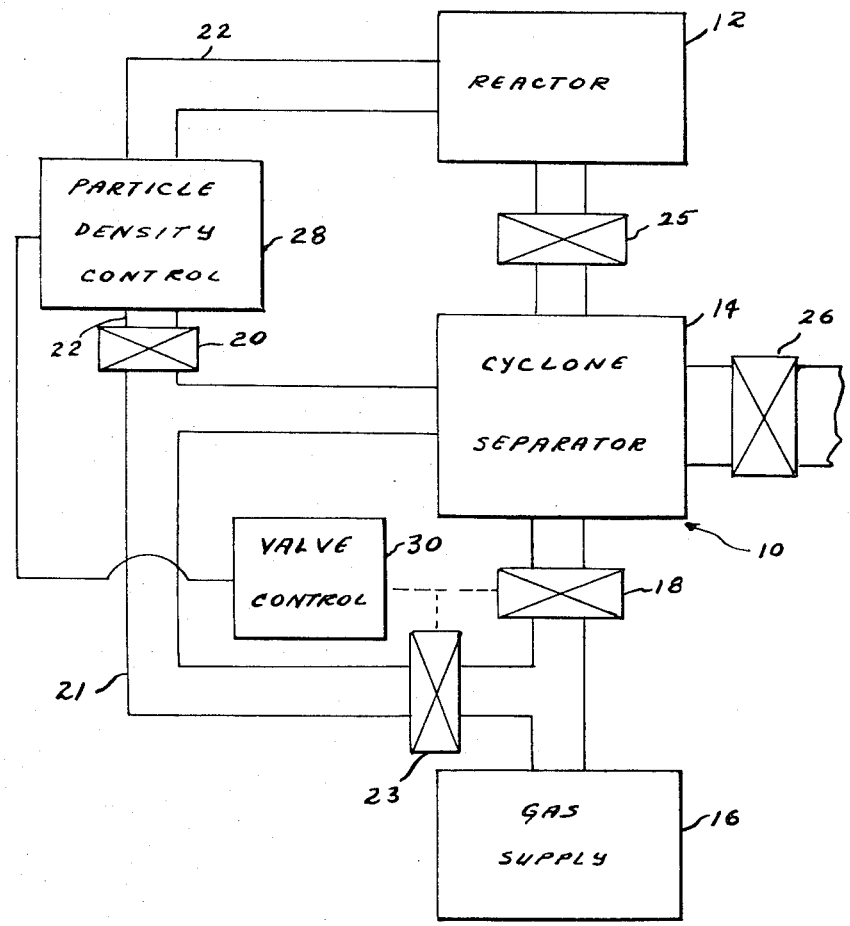
FIG. 1 is a schematic block diagram of a nuclear reactor fuel charging and discharging with the particle density sensing and control system of the invention.

Reference is now made to FIG. 1 of the drawing which shows a nuclear reactor charging and discharging system 10, wherein fuel is normally supplied to the reactor 12 from cyclone separator fuel supply 14 by passing gas from gas supply 16 through the separator 14 when valves 18 and 20 are open. By-pass gas is permitted to flow through conduit 21 when valve 23 is open, as will be explained later. With valves 18 and 20 closed and valves 25 and 26 open, nuclear fuel is removed from the reactor in conventional manner as described in the Jackomis application. A particle density control circuit 28 connected in line 22 senses the density of particle flow, as will be described with respect to FIG. 2, and provides an output signal proportional to phase which is applied to a valve control circuit 30 which operates valves 18 and 23. The control circuit will have an adjustable reference voltage, used in the conventional manner, to set the desired particle density with the error signal used to control valves 18 and 23. The valves 18 and 23 are connected so that when the particle density is greater than desired, valve 18 is turned toward its closed position and valve 23 is turned toward its open position to increase the by-pass gas flow. When the particle density is less than desired, valve 18 is turned toward its open position and valve 23 is turned toward its closed position to decrease the by-pass gas flow.

Though the valve control 30 and valves 18 and 23 are shown as separate elements, these could be separate elements or could all be combined in a single unit.

Also, the valves 18 and 23 could each be, in fact, two valves; one of each being an on/off valve to initiate flow and the other of each being operated by valve control 30 to control flow.

Figure 2:
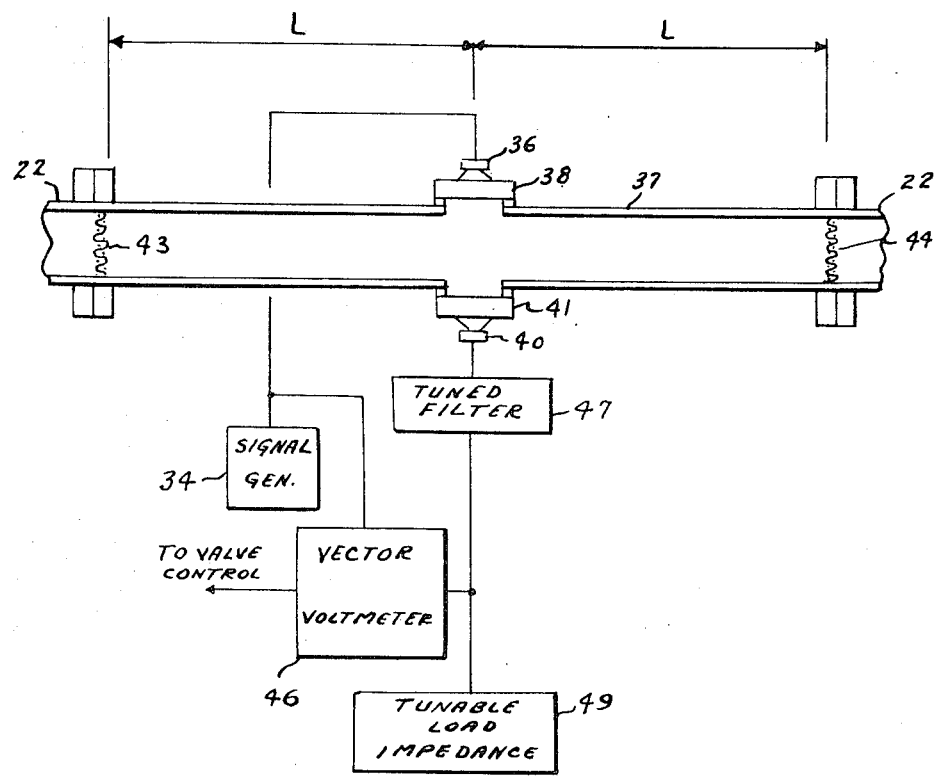
FIG. 2 is a schematic diagram partially in block form of the particle density sensing and control system of the invention.

As shown in FIG. 2, a signal from signal generator 34 is supplied to a sound transmitter 36 positioned on one side of tube 37. The sound transmitter is mounted on a sound isolating material 38, such as rubber. A microphone 40 is mounted on sound isolating material 41 on the opposite side of the tube 37. Metal mesh screens 43 and 44 are positioned in the flow channel in tube 37 a distance L from the sound transmitter, where the length L is at least twice the wave length of the transmitted sound wave. The holes in the mesh screen may be any size that will readily pass the solid particles, and should be less than one tenth wave length of the sound wave.

The output of the microphone 40 is supplied to a vector voltmeter 46 through a tuned filter 47. A tunable load impedance 49 is also connected in the microphone output circuit. The vector voltmeter 46 may be of the type shown on page 252, Hewlett Packard, 1968 catalog "Instrumentation (Electronic Analytical Medical)." This meter provides a voltage reading, a phase reading, and a phase output signal which may be used to control the valve control 30.

In the operation of the device, valves 18 and 23 are turned on to initiate flow of fuel into the reactor cavity in the manner described in the Jackomis patent application. The signal generator 34 then applies a signal to audio transmitter 36 to produce a high frequency sound signal in tubular element 37. The phase between the signal applied to the audio transmitter 36 and the signal output from the microphone 40 is indicated by the vector voltmeter 46, and an output signal proportional to phase from the vector voltmeter 46 is supplied to the valve control 30 to adjust valves 18 and 23 to provide the desired particle density in the input to the reactor cavity. Depending upon the particular operation desired, the vector voltmeter may be calibrated initially with either no flow through tube 37 or with only gas flow through tube 37 by adjusting the tuned filter and the tunable load impedance.

There is thus provided a particle density control system for use in the charging system for a colloid core nuclear reactor.

While the particle density control apparatus is described for use in a colloid core reactor, it could be used in any system wherein the particle density in a gas flow is desired. Also, the output of the signal generator and microphone could be supplied to a dual input oscilloscope for test purposes.

I claim:

1. An apparatus for indicating the particle density in a particle laden gas comprising: a tubular element adapted to receive the particle laden gas at one end and for discharging the particle laden gas at the other end; a signal generator having a signal output means; means, including a sound producing means connected to the output means of said signal generator and positioned on one side of the tubular element, for directing a sound signal into the tubular element; sound receiving means on the side of the tubular element opposite the means for directing a sound signal into the tubular element for providing an output signal in response to said sound signal means responsive to the signal output means of said signal generator and the output signal of the sound receiving means for indicating the phase between signal input to the sound producing means and the output signal of the sound receiving means; a first acoustic screen having openings less than one tenth of a wave length of the sound signal, adapted to pass the particle laden gas, positioned within the tubular element on one side of the sound producing means a distance of at least two wave lengths of the sound signal, a second acoustic screen having openings less than one tenth of a wave length of the sound signal, adapted to pass the particle laden gas, positioned within the tubular element on the other side of the sound producing means a distance of at least two wave lengths of the sound signal.

2. The device as recited in claim 1 wherein the means responsive to the signal output means of the signal generator and the output signal of the sound receiving means includes means for providing a control output signal proportional to the phase difference between the input to the sound producing means and the output signal of the sound receiving means.

3. In combination with the apparatus recited in claim 2, means including a particle supply for supplying particle laden gas to said one end of said tubular element and means responsive to the control output signal proportional to the phase difference between the input to the sound producing means and the output signal of the sound receiving means for controlling the particle density in particle laden gas passing through the tubular element.

4. The device as recited in claim 3 wherein the means for controlling particle density includes means for supplying a gas flow through the particle supply to provide the particle laden gas flow through the tubular element; means for providing a by-pass flow of gas around the particle supply and valve means, responsive the control output signal for controlling the flow through the particle supply and through the by-pass flow means whereby the particle density in the tubular element can be controlled.

* * * * *